United States Patent
Wu

[11] Patent Number: 6,145,521
[45] Date of Patent: Nov. 14, 2000

[54] CLEANING MECHANISM FOR MOLD DEVICE

[76] Inventor: Su Mei Wu, No. 2, Lane 225, Fong Jern Road, Jern Wu Hsiang, Kaohsiung Hsien, Taiwan

[21] Appl. No.: 09/204,227

[22] Filed: Dec. 3, 1998

[51] Int. Cl.⁷ ....................................................... B08B 3/02
[52] U.S. Cl. ..................... 134/104.4; 15/316.1; 134/105; 134/133; 134/180; 134/199; 134/200
[58] Field of Search ................................ 134/104.4, 105, 134/133, 172, 180, 181, 199, 200; 15/316.1

[56] References Cited

U.S. PATENT DOCUMENTS

| | | | |
|---|---|---|---|
| 2,989,061 | 6/1961 | Winkler | 134/105 X |
| 4,198,995 | 4/1980 | Kachkarov et al. | 134/133 |
| 4,238,245 | 12/1980 | Kachkarov et al. | 134/133 |
| 4,744,379 | 5/1988 | Goettel | 134/133 X |

*Primary Examiner*—Philip R. Coe
*Attorney, Agent, or Firm*—Charles E. Baxley

[57] ABSTRACT

A cleaning mechanism for mold devices includes one or more rails for slidably supporting a slide. An actuator is coupled to the slide for moving the slide along the rails. The slide may be releasably coupled to the actuator by a latch. A heating device is disposed on the slide for supporting and for heating the mold devices. One or more nozzles are disposed in the housing for supplying water or cleaning agent or pressurized air into the housing and for cleaning the mold devices. A rotating device may further be used for rotating the nozzles.

11 Claims, 3 Drawing Sheets

CLEANING MECHANISM FOR MOLD DEVICE

BACKGROUND OF THE INVENTION

1. Field of the Invention

The present invention relates to a cleaning mechanism, and more particularly to a cleaning mechanism for cleaning mold devices.

2. Description of the Prior Art

Typical machines include a mold device for manufacturing integrated circuit boards. Mold releasing agent is required to be injected into the mold device for releasing the manufactured integrated circuit boards. After conducting molding processes for a period of time, the mold releasing agent may be carbonized and attached onto the mold device, such that the mold device is required to be removed from the machine and is required to be cleaned frequently. However, the mold device is normally cleaned manually. No cleaning mechanisms have been developed for cleaning the mold device automatically.

The present invention has arisen to mitigate and/or obviate the afore-described disadvantages of the conventional mold device cleaning problems.

SUMMARY OF THE INVENTION

The primary objective of the present invention is to provide a cleaning mechanism for cleaning mold devices automatically.

In accordance with one aspect of the invention, there is provided a cleaning mechanism for mold devices comprising a housing including a guide device provided therein, a slide slidably engaged on the guide device and to be moved along the guide device, means for moving the slide along the guide device, a heating device disposed on the slide for heating the mold devices, and at least one nozzle disposed in the housing for cleaning the mold devices.

The guide device includes at least one rail disposed in the housing, the slide is slidably engaged on the rail. The slide includes a wheel device attached thereto for slidably engaging with the rail.

The slide moving means includes an actuator disposed in the housing and having a piston rod extended therefrom, the slide includes means for coupling the slide to the piston rod of the actuator. The slide coupling means includes a latch pivotally coupled to the slide, the latch includes a first end for engaging with the piston rod and for coupling the slide to the actuator and includes a second end for disengaging the first end of the latch from the piston rod of the actuator. A spring biasing device is further provided for biasing the first end of the latch to engage with the piston rod of the actuator.

The heating device includes a body disposed on the slide and includes a heater disposed in the body, the body includes an upper recess for receiving the mold devices. A rotating device is further provided for rotating the nozzle for facilitating a cleaning effect to the mold devices.

The housing includes a side opening, a door for enclosing the side opening, and means for actuating the door to enclose the side opening, the rail is extended outward of the housing via the side opening for allowing the slide to be moved outward of the housing.

The housing includes an entrance formed therein, and includes a cover pivotally secured to the housing for enclosing the entrance, and includes a stay for supporting the cover at an open position. The housing includes a lower portion having a collector attached thereto for collecting dirt, the collector includes an access for removing the dirt.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
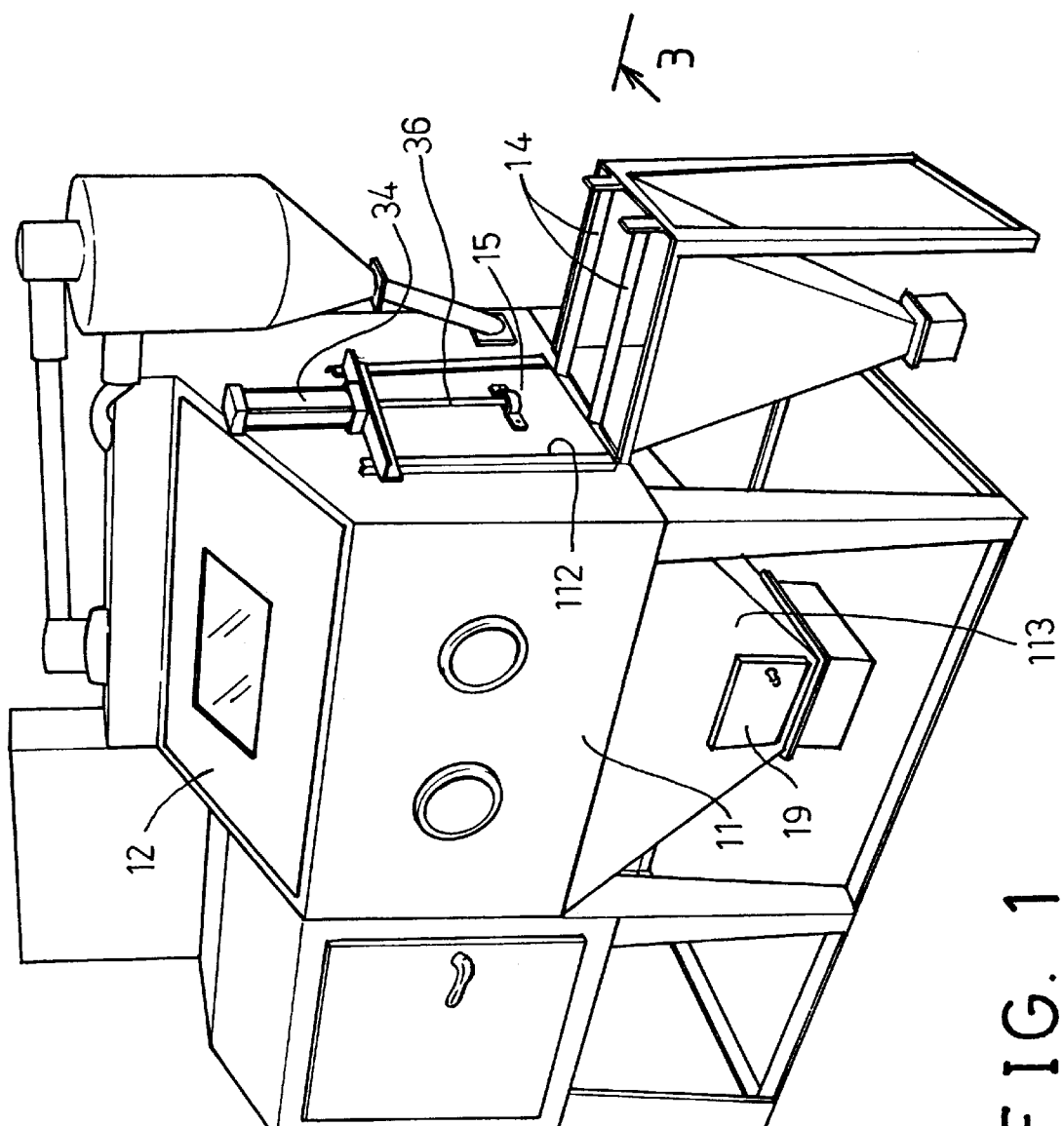
FIG. 1 is a perspective view of a mechanism for cleaning mold devices in accordance with the present invention.
Figure 2:
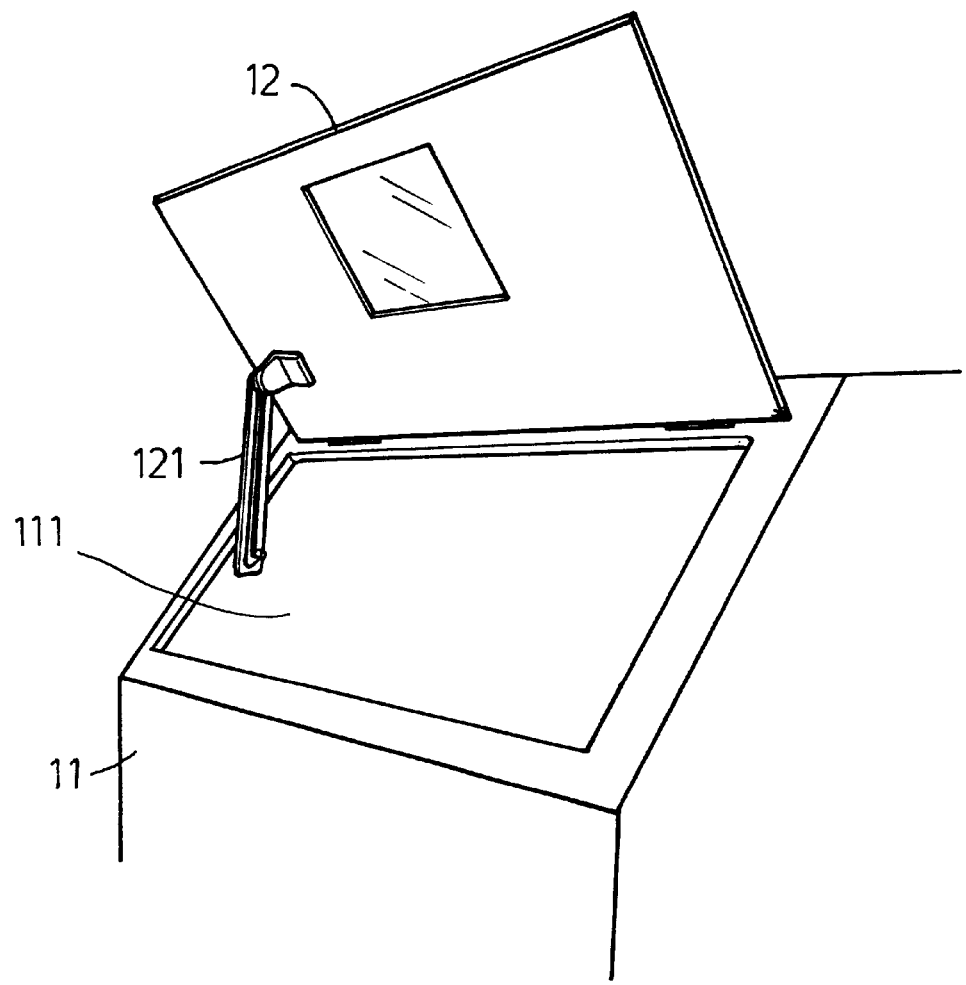
FIG. 2 is a partial perspective view illustrating the operation of the cleaning mechanism.
Figure 3:
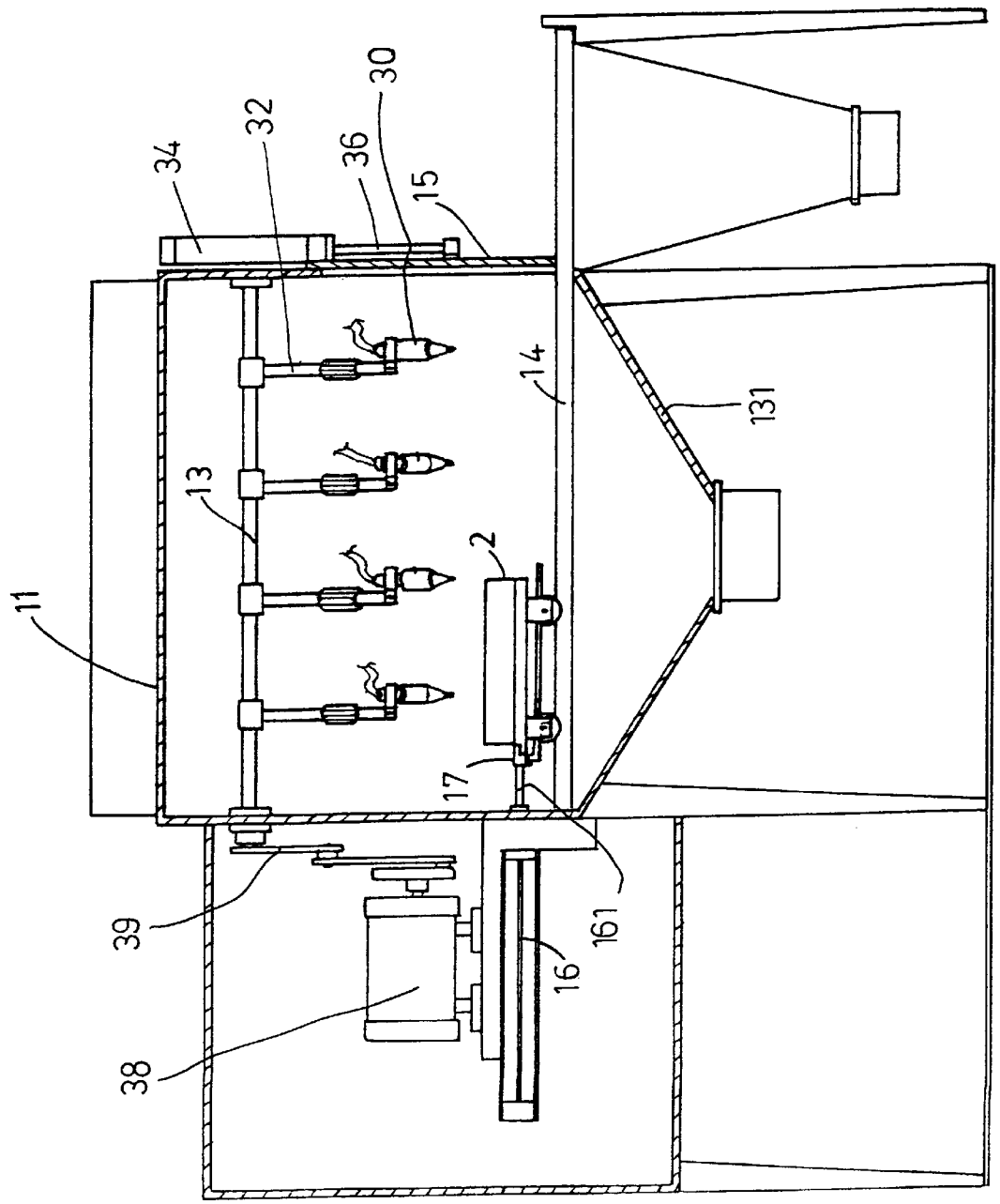
FIG. 3 is a cross sectional view taken along lines 3—3 of FIG. 1.

Referring to the drawings, and initially to FIGS. 1–3, a cleaning mechanism in accordance with the present invention comprises a housing 11 including an entrance 111 formed in the upper portion for entering into the housing 11 and including a cover 12 pivotally coupled to the housing 11 for enclosing the upper entrance 111 and including a quick release hinge or a stay 121 for supporting the cover 12 at the open position (FIG. 2). A shaft 13 (FIG. 3) is rotatably secured in the housing 11. One or more sprayers or spraying nozzles 30 are attached to the shaft 13 by rods 32 and rotated in concert with the shaft 13. A motor 38 is secured in the housing 11 and coupled to the shaft 13 by coupling cranks or links 39 for rotating the shaft 13 in a reciprocating and swinging action. The spraying nozzles 30 may be coupled to a cleaning agent and/or water source for supplying the cleaning agent and/or the water to the housing, and/or coupled to a pressurized air source for supplying pressurized air into the housing 11 for cleaning purposes.

A guide device includes one or more rails 14 laterally disposed in the housing 11 and having one end extended outward of the housing 11 (FIGS. 1, 3). The housing 11 includes a side opening 112 enclosed by a door 15. An actuator, such as a hydraulic or pneumatic cylinder 34 is attached to the housing 11 and has a piston rod 36 coupled to the door 15 for actuating the door 15. Another actuator, such as a hydraulic or pneumatic cylinder 16 is disposed in the housing 11 and has a block 17 secured to the piston rod 161 thereof.

Figure 4:
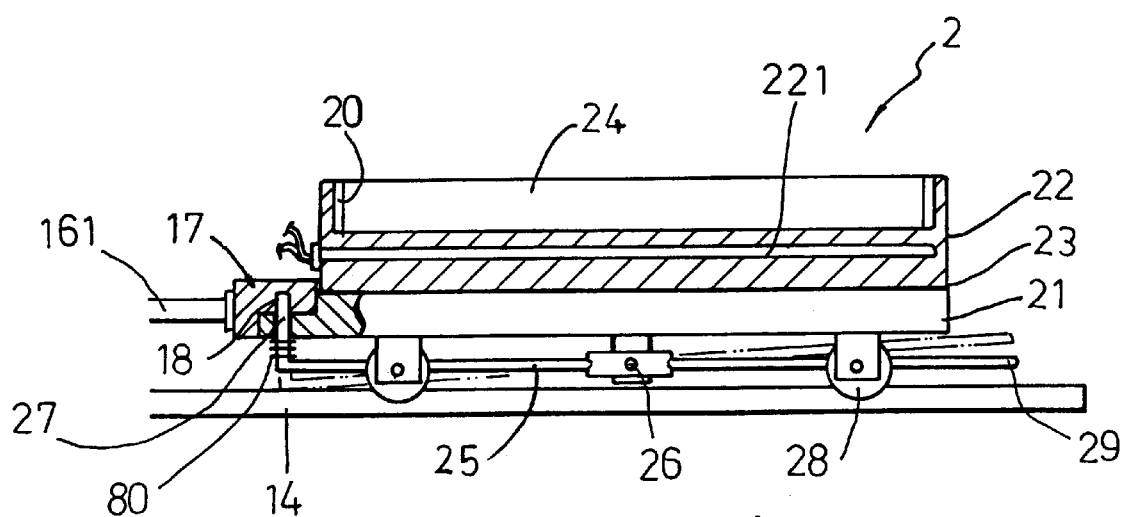
FIG. 4 is an enlarged cross sectional view of a heating device of the cleaning mechanism.

As shown in FIGS. 3 and 4, the block 17 includes an orifice 18 formed therein (FIG. 4). A slide 21 is slidably engaged on the rails 14 by such as wheels 28. A latch 25 is pivotally coupled to the slide 21 at a pivot pin 26 and has one end 27 biased to engage with the orifice 18 of the block 17 by a spring 80, for allowing the slide 21 to be moved along the guide device 14 by the actuator 16. The other end 29 of the latch 25 may be acted as a handle for disengaging the one end 27 of the latch 25 from the orifice 18 of the block 17 and for allowing the slide 21 to be released from the actuator 16. A heating device 2 includes a body 22 disposed on the slide 21 and heater 221 disposed in the body 22 for heating the body 22. A heat insulating member 23 is preferably provided between the heating device 2 and the slide 21 for preventing the slide 21 from being heated and damaged. The body 22 includes a recess 220 formed in the upper portion for receiving one or more mold devices 24 to be cleaned. The end 27 of the latch 25 may also be directly attached to the piston rod 161 without the block 17. The slide 21 may be moved out of the housing 11 via the side opening 112 when the door 15 is opened.

In operation, the mold devices 24 to be cleaned are disposed on the body 22 of the heating device 2 so as to be heated by the heater 221 and so as to heat and/or soften and/or decompose the carbonized member or the dirt attached on the mold devices 24. The cleaning agent and/or the water is then supplied into the housing 11 via the nozzles 30 for cleaning the mold devices 24. The nozzles 30 may further be rotated for facilitating the cleaning effect to the mold devices 24. A collector 113 is attached to the bottom of the housing 11 for collecting the dirt and/or the cleaned carbonized members, and includes an access 19 for removing the dirt and/or the carbonized members.

Accordingly, the cleaning mechanism in accordance with the present invention may be used for cleaning mold devices automatically.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cleaning mechanism for cleaning mold devices, said cleaning mechanism comprising:
    a housing including a guide device provided therein,
    a slide slidably engaged on said guide device and to be moved along said guide device,
    means for moving said slide along said guide device,
    a heating device disposed on said slide, said heating device being provided for supporting the mold devices and for heating the mold devices, and
    at least one nozzle disposed in said housing for supplying a cleaning agent to the mold devices and for cleaning the mold devices.

2. The cleaning mechanism according to claim 1, wherein said guide device includes at least one rail disposed in said housing, said slide is slidably engaged on said at least one rail.

3. The cleaning mechanism according to claim 2, wherein said slide includes a wheel device attached thereto for slidably engaging with said at least one rail.

4. The cleaning mechanism according to claim 2, wherein said housing includes a side opening, a door for enclosing said side opening, and means for actuating said door to enclose said side opening, said at least one rail is extended outward of said housing via said side opening for allowing said slide to be moved outward of said housing.

5. The cleaning mechanism according to claim 1, wherein said slide moving means includes an actuator disposed in said housing and having a piston rod extended therefrom, said slide includes means for coupling said slide to said piston rod of said actuator.

6. The cleaning mechanism according to claim 5, wherein said slide coupling means includes a latch pivotally coupled to said slide, said latch includes a first end for engaging with said piston rod and for coupling said slide to said actuator and includes a second end for disengaging said first end of said latch from said piston rod of said actuator.

7. The cleaning mechanism according to claim 6 further comprising means for biasing said first end of said latch to engage with said piston rod of said actuator.

8. The cleaning mechanism according to claim 1, wherein said heating device includes a body disposed on said slide and includes a heater disposed in said body, said body includes an upper recess for receiving the mold devices.

9. The cleaning mechanism according to claim 1 further comprising means for rotating said at least one nozzle for facilitating a cleaning effect to the mold devices.

10. The cleaning mechanism according to claim 1, wherein said housing includes an entrance formed therein, and includes a cover pivotally secured to said housing for enclosing said entrance, and includes a stay for supporting said cover at an open position.

11. The cleaning mechanism according to claim 1, wherein said housing includes a lower portion having a collector attached thereto for collecting dirt, said collector includes an access for removing the dirt.

* * * * *